J. R. NAYLOR.
TRAFFIC SIGNAL.
APPLICATION FILED MAY 10, 1920. RENEWED JAN. 12, 1922.
1,431,414.
Patented Oct. 10, 1922
2 SHEETS—SHEET 1.
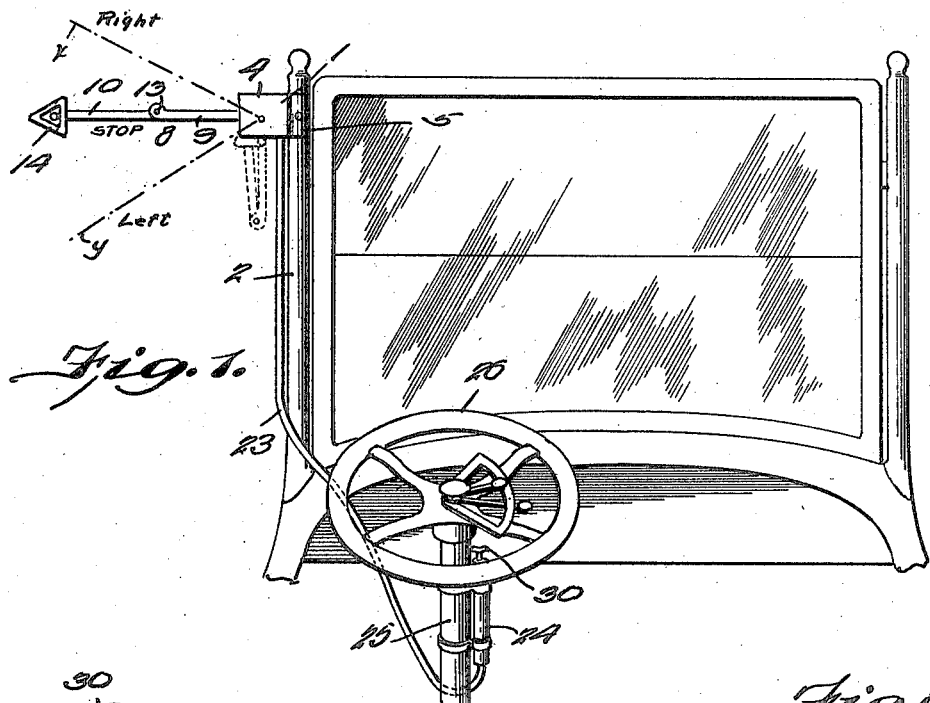
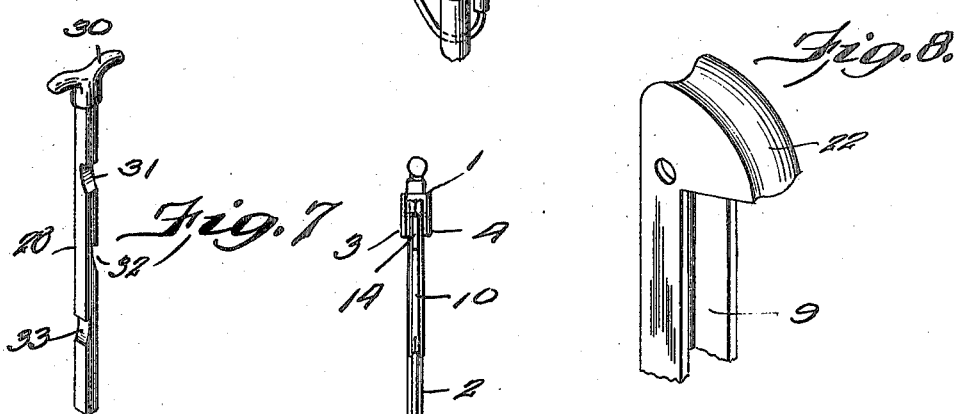
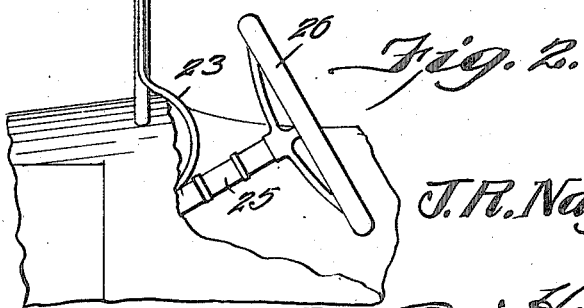
Witness
Inventor
J. R. Naylor
By
Attorney

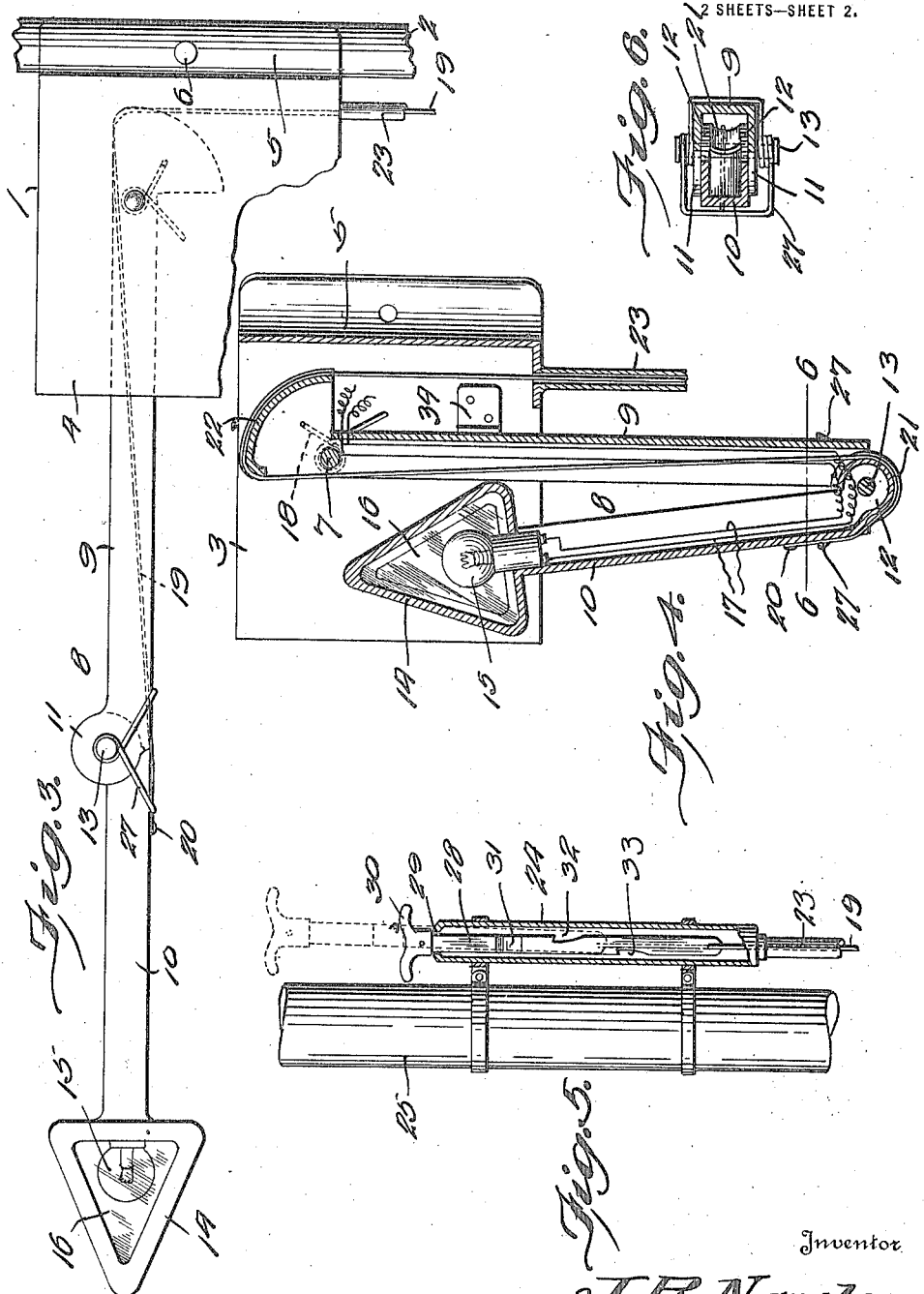

Patented Oct. 10, 1922.

1,431,414

UNITED STATES PATENT OFFICE.

JESSE R. NAYLOR, OF PORTLAND, OREGON.

TRAFFIC SIGNAL.

Application filed May 10, 1920, Serial No. 380,133. Renewed January 12, 1922. Serial No. 528,817.

*To all whom it may concern:*

Be it known that I, JESSE R. NAYLOR, a citizen of the United States, residing at Portland, in the county of Multnomah and State of Oregon, have invented new and useful Improvements in Traffic Signals, of which the following is a specification.

This invention relates to traffic signals for use upon automobiles or other vehicles, whereby the driver of the vehicle may signal to the drivers of other vehicles, to crossing policemen and to pedestrians his intention to stop or to turn his vehicle to the right or left in order to avoid the possibility of accidents.

One object of the invention is to provide a mechanical traffic signal of the semaphore type whereby the operation of hand-signalling may be closely simulated.

Another object of the invention is to provide a traffic signal which is adapted for both day and night use, and which when not in signalling position will fold in compact order close to the vehicle.

Still another object of the invention is to provide a traffic signal which is inexpensive and durable and adapted to be readily applied to any ordinary type of automobile and conveniently operated by the driver thereof.

The invention consists of the features of construction, combination and arrangement of parts, hereinafter fully described and claimed, reference being had to the accompanying drawings, in which:

Figure 1 is a view looking from the rear toward the windshield and steering wheel of an automobile, and showing the application of the invention thereto.

Figure 2 is a fragmentary side elevation, partly broken away, of the body of the automobile, showing the parts illustrated in Figure 1.

Figure 3 is a view in rear elevation of the signal device, showing the signal arm extended in horizontal or "left" position.

Figure 4 is a vertical transverse section through the signal device, showing the signal arm in folded position.

Figure 5 is a view in elevation of the steering column and in section of the arm controlling and locking device carried thereby.

Figure 6 is a sectional view taken on line 6—6 of Figure 4.

Figure 7 is a perspective view of the operating and locking plunger.

Figure 8 is a similar view of a portion of the main section of the signal arm.

Referring to the drawings, 1 designates as a whole a bracket for supporting the signal device proper from one of the windshield supporting posts 2 of the automobile, the signal being preferably arranged at the left hand side of the vehicle. This bracket 1 comprises a pair of spaced front and rear shield plates 3 and 4 connected at their inner ends with a partially circular cuff 5 which embraces the post 2 and is secured thereto by one or more fastening pins, screws or like fasteners 6.

Extending between the shield plates 3 and 4 is a pin or bolt 7 which pivotally supports the semaphore or signal arm 8, which comprises an inner or main section 9 and an outer or signal carrying section 10. These signal arm sections are preferably formed of channeled sheet metal provided at their adjacent ends with ears 11 and 12 respectively perforated for the passage of a pivot pin or bolt 13, whereby the said arm sections 9 and 10 are jointed so as to be extended in longitudinal or axial alinement, as shown in Figure 3, or to be folded in substantially parallel relation, as shown in Figure 4. The arm section 10 is provided at its outer or free end with a hand or indicator 14, comprising a triangular casing enclosing an electric lamp 15 and provided with transparent front and rear panels 16, of suitable color, through which the rays of light from the lamp may shine for signalling purposes at night. Electric conductors 17 lead from the terminals and the lamp through the channeled portions of the arms to the electric lighting circuit of the car, and in practice suitable means may be provided for controlling the supply of current to the lamp for night use.

The main arm section 9 is adapted to normally assume by gravity a vertical pendent position, as shown in Figure 4, such being its position when the signal arm is folded and not in use. To ensure the proper downward movement from the signalling position shown in Figures 1 and 3 to the pendent position shown in Figure 4, a spring 18 is provided, said spring having coiled portions encircling the ends of the pivot member 7 and oppositely extending arms terminating in angularly bent ends fitted in suitable openings in the shield plates 3 and 4, such spring being tensioned when the arm is swung to signalling position and exerting its reaction energy to quickly start the arm on its downward movement, thus ensuring a quick return of the arm by gravity and the action of the spring to pendent position in the retraction of the signal.

The arm section 10 is adapted to be positively moved outward to a position in longitudinal alinement with the arm section 9, and the arm 8 as a whole to be swung to indicating position, by operating means under the control of the driver of the vehicle. Such operating means comprises a cable 19 connected at its outer end to the outer surface of the arm section 10, adjacent to the pivotal connection 13, as indicated at 20, said cable thence extending over a portion 21 at the hinged end of the arm section 10, through the channel of the arm section 9, over a portion 22 at the hinged end of the arm section 9, and thence downwardly and through a guide tube 23 leading to the lower end of a plunger casing 24 suitably secured to the steering post column 25 of the vehicle in close proximity to the steering wheel 26. The portion 21 of the arm section 10 is in the form of a segment on which the cable 19 may act with a crank action to swing said arm section 10 outwardly, when said cable is drawn upon, and the portion 22 of the arm section 9 is in the form of a segment or quadrant on which the cable may similarly act to swing said arm section 9 outwardly when the cable is drawn upon, said segments 21 and 22 being preferably grooved to receive the cable and permit the same to lie snugly in contact therewith and to hold the cable from displacement. Hence it will be understood that by the prescribed movements of the cable 19 when drawn upon from the vehicle the arm sections 9 and 10 may be swung outwardly into longitudinal alinement with each other and thence upwardly to indicating positions, three of such indicating positions being contemplated, one in which the arm extends horizontally or at right angles from the vehicle, as indicated in full lines in Figure 1, to indicate "turn left", and other positions, as indicated by the dotted lines $x-y$ in Figure 1 to equal positions above and below the horizontal, to indicate respectively right and stop turns. By this means the signal arm may be adjusted to signalling positions required by the laws of certain States in hand signalling to indicate that the driver of the vehicle intends to bring his macheine to a stop or to turn to the right or left, whereby the signalling arm is adapted to be adjusted to simulate such methods of hand signalling. A spring 27 is provided for the purpose of moving the arm section 10 inwardly to folded position. This spring is made of wire and has coiled portions embracing the ends of the pivot pin 13 and bail-shaped arms which are arranged to embrace and bear respectively upon the arm sections 9 and 10 adjacent to the pivot joint 13. The coils of this spring operate normally to move the arms thereof inwardly to bring the arm sections 9 and 10 into substantially parallel or folded relationship, and when the arm is extended and the bail-shaped portions of the spring moved outwardly the coiled portions thereof are placed under tension for subsequent action in folding the arm section 10 inwardly. When the cable 19 is drawn upon to swing the arm section 10 outwardly and move the arm to extended and signalling positions, it performs the function of extending the arm section 10 against the resistance of the spring 27. Hence when the cable 19 is relaxed, the spring 18 will start the downward swinging movement of the arm section 9 which will drop to the pendent position shown in Figure 4, carrying with it the arm section 10, and the spring 27 will thereupon swing the arm section 10 inwardly and in substantially parallel relation to the arm section 9. When the arm sections are so disposed, the indicator 14 will be brought to a non-indicating position between the shield plates 3 and 4, which will cover and conceal the same, allowing the signal to fold to a compact position along side the windshield post 2, close to the side of the vehicle.

The inner end of the cable 19 is secured to the lower end of an operating and locking plunger 28 arranged for movement in the casing 24, said plunger comprising a bar or stem movable through an opening 29 in the top of the casing and having at its upper end a handle or finger piece 30 whereby it may be manipulated. The plunger stem is provided at determined intervals with notches or recesses 31, 32 and 33 forming locking shoulders for engagement with the edge wall of the opening 29 to hold the plunger elevated to different degrees for drawing actions upon the cable to extents necessary to move the signal arm to the said signalling positions, and to lock or hold it in either of such signalling positions at will, the mode of locking and releasing the plunger being obvious from the structure shown in Figures 5 and 7. When the plunger is in its normal or lowermost position shown in full lines in Figure 5, the cable 19 will be relaxed and the signal arm will accordingly assume the pendent and folded position illustrated in Figure 4, but by moving the plunger upwardly, as indicated in dotted lines in Figure 5, to any one of the three different positions mentioned, the cable will be drawn upon to swing the arm to one or the other of the locking positions and may be fixed to hold the arm in the desired indicating position against the resistance of the springs 18 and 27 and the tendency of the signal arm to drop by gravity.

From the foregoing description, taken in connection with the drawings, the construction and mode of use of my improved traffic signal will be readily understood, and it will be seen that the invention provides a device of this character which is simple of construction, compact in character, and adapted to be applied for use upon any ordinary type of automobile, and that when the signal is in normal or non-indicating position it will lie close to the vehicle in an out of the way position. Also it will be seen that a type of signal is provided by means of which hand signalling, as required under the laws of certain States may be mechanically simulated, and by means of which day and night signalling is afforded with equal efficiency. As the device is simple of construction, and composed of a comparatively small number of parts, it is of a durable character and may be manufactured and installed at a comparatively low cost.

Having thus fully described my invention, I claim:

1. A traffic signal comprising a supporting bracket, a signal arm composed of jointed inner and outer sections, the inner section being pivoted to the bracket, said arm being adapted to automatically swing downward to a pendent position, means acting upon the outer arm section to normally fold the same substantially parallel with the inner arm section, a cable operatively coupled to both arm sections to swing said arm sections into alinement with each other and to one or more signalling positions, and means for controlling said cable and holding the same to maintain the arm in signalling position.

2. A traffic signal comprising a supporting bracket, a signal arm composed of pivotally connected inner and outer sections, the inner section being pivoted to the bracket, said arm being adapted to automatically swing downward to a pendent position, springs associated with the respective pivotal connections to respectively assist in swinging the inner arm downward and to fold the outer arm upwardly and inwardly substantially parallel with said inner arm, a cable operatively connected with both arm sections to swing said arm sections into alignment with each other and to one or more signalling positions, and means for controlling said cable and holding the same to maintain the arm in signalling position.

3. A traffic signal comprising a supporting bracket having spaced shield plates, a signal arm comprising inner and outer sections pivotally connected at their adjacent ends to fold vertically in substantially parallel relation, said inner arm section being pivotally connected at its inner end to said bracket between said shield plates, an indicator carried by the outer arm section and adapted to be concealed between the shield plates when the arm is folded, a cable operatively connected with both arm sections to swing said arm sections into alinement with each other and to one or more signalling positions, and means for controlling said cable and holding the same to maintain the arm in signalling position.

4. A traffic signal comprising a supporting bracket, a signal arm composed of pivotally connected inner and outer sections, the inner section being pivoted to the bracket, said arm being adapted to automatically swing downward to a pendent position, grooved segments upon the pivoted ends of the arm sections, a cable secured at one end to the outer arm section and trained over said segments upon both arm sections and adapted to be drawn upon to swing said arm sections into alinement with each other and to one or more signalling positions, and means for controlling said cable and holding the same to maintain the arm in signalling position.

5. A traffic signal comprising a supporting bracket having spaced shield plates, an inner signal arm section pivotally mounted at its upper end between said plates, an outer signal arm section pivotally mounted at its lower end to the lower end of the inner arm section, said arm sections being adapted to normally drop to pendent position upon their pivotal connections, a spring associated with the pivot of the inner arm section to assist in turning said arm section to normal position, a spring associated with the pivotal connection of the outer arm section to assist in swinging said outer arm section upwardly parallel with said inner arm section, an indicator carried by the outer arm section, segments upon the pivoted ends of said arm sections, and an operating cable trained over said segments and connected at one end with the outer arm section beyond the pivot of the latter, said cable adapted when relaxed to permit said arm sections to swing and fold to normal position as described and adapted when drawn upon to swing said arm sections outwardly to a more or less horizontal position and in more or less longitudinal alinement with each other.

6. A traffic signal comprising a supporting bracket having spaced shield portions, a signal arm consisting of an inner arm section pivoted at its inner end between said shield portions of the bracket and an outer arm section pivoted at its inner end to the outer end of the inner arm section, said sections being normally adapted to drop by gravity to a pendent vertical position, a signal member upon the outer end of the outer arm section, a connecting spring between the pivoted ends of the arm sections acting to normally fold the outer arm section inwardly and parallel with the inner arm section, and a cable operatively connected to both arm sections so as to be drawn upon to swing said arm sections into longitudinal alinement and into a more or less horizontal position.

7. A traffic signal comprising a supporting bracket, a signal arm consisting of an inner arm section pivoted at its inner end to said bracket and an outer arm section pivoted at its inner end to the outer end of the inner arm section, said sections being normally adapted to drop by gravity to a pendent vertical position, a connecting spring between the pivoted ends of the arm sections acting to normally fold the outer arm section inwardly and parallel with the inner arm section, and a cable operatively connected to both arm sections so as to be drawn upon to swing said arm sections into longitudinal alinement and into a more or less horizontal position.

In testimony whereof I affix my signature.

JESSE R. NAYLOR.